United States Patent [19]
Vyhmeister

[11] Patent Number: 5,592,244
[45] Date of Patent: Jan. 7, 1997

[54] HOLDING DEVICE FOR EYEGLASSES

[76] Inventor: Edwin D. Vyhmeister, 4005 NE. 160th St., Seattle, Wash. 98155

[21] Appl. No.: 590,544

[22] Filed: Jan. 24, 1996

[51] Int. Cl.$^6$ .............................. G02C 1/00; A47F 5/00
[52] U.S. Cl. ....................... 351/158; 248/309.1; 248/902
[58] Field of Search ..................... 351/158; 248/309.1, 248/902; 211/13

[56] References Cited

U.S. PATENT DOCUMENTS

| | | | |
|---|---|---|---|
| Re. 34,120 | 11/1992 | Plahn | 248/206.3 |
| 363,525 | 5/1887 | Lipp | 248/309.1 |
| 952,495 | 3/1910 | Austin | 248/309.1 |
| 2,467,251 | 4/1949 | Bowman | 248/300 |
| 2,875,973 | 3/1959 | Hull | 248/206 |
| 2,948,500 | 8/1960 | Kühn | 248/122 |
| 3,519,138 | 7/1970 | Murray | 211/13 |
| 4,128,224 | 12/1978 | Guichard | 248/316 A |
| 4,461,439 | 7/1984 | Rose | 248/51 |
| 4,867,402 | 9/1989 | Benson et al. | 248/902 X |
| 5,085,388 | 2/1992 | Creutz | 248/288.5 |

*Primary Examiner*—Huy Mai
*Attorney, Agent, or Firm*—Seed and Berry LLP

[57] ABSTRACT

A holding device for removably retaining eyeglasses therein when the eyeglasses are not in use. The holding device includes a rear flange, a flexible retaining flange spaced apart from the rear flange, a nasaloid support member between the rear flange and retaining flange in a position to removably support the nasal pads of the eyeglasses when the eyeglasses are in a retained position. The rear and retaining flanges are contoured to form a glasses receiving area therebetween such that the rear and retaining flanges engage the glasses and hold the glasses in the receiving area. The retaining flange has a flexible curved upper portion that extends toward the rear flange, such that the flexible upper portion is above the nasaloid support member. An arm support member is attached to the retaining flange, and is positioned to support at least one of the arms of the eyeglasses when the eyeglasses are in the retained position. The arm support member includes an arm blocking tab that is spaced apart from the retaining flange with the flexible retaining flange being intermediate the front blocking tab and the rear flange. When the glasses are in the retained position, the arms of the glasses criss-cross between the arm blocking tab and the retaining flange, and the bridge and nasal pads of the glasses are retained on or above the nasaloid support members between the rear flange and the retaining flange.

23 Claims, 4 Drawing Sheets

HOLDING DEVICE FOR EYEGLASSES

Technical Field

The present invention is directed toward a holding device, and more particularly, toward a holding device for removably retaining eyeglasses.

Background of the Invention

Operators of motor vehicles, such as automobiles, trucks, boats, airplanes, and the like, often wear eyeglasses including prescription glasses, sunglasses, or protective glasses during at least a portion of the time they are operating the vehicle. When the operator needs to put on a pair of glasses or change glasses while operating the vehicle, the operator is typically faced with the problem of quickly locating and reaching new glasses without being distracted from safely operating the vehicle.

In the case of an automobile, glasses, particularly sunglasses, are often stored in different locations throughout the vehicle, including above the sun visor, in a glove compartment, in a dash board, under the seat, on the adjacent seat, or in the ashtray. As a result, the sunglasses can be difficult to locate, difficult to reach, and can be scratched, broken, sat upon, or otherwise damaged when not in use. Replacing the glasses that have been broken or damaged due to improper storage is inconvenient and costly.

Accordingly, it is desirable for the vehicle operator to have quick and easy access to the glasses without adversely affecting safe operation of the vehicle. It is also highly desirable for the operator to store the unused pair of glasses or sunglasses in an accessible location so the glasses are safe from being damaged, broken, or lost. Holding devices for eyeglasses, such as those described in U.S. Pat. Nos. 5,085,388; 4,867,402; 4,128,224; 3,519,138; 2.948,500; and 2,467,251, are known. However, these holding devices have various drawbacks, including unstable support of the glasses, which can allow the glasses to rattle in the holder or fall out of the holder during, as an example, bumpy conditions occurring during operation of the vehicle. Other drawbacks of the holding devices include relatively complex designs with moving parts that create difficulty in storing or removing the glasses into or from the device.

SUMMARY OF THE INVENTION

The present invention is directed toward a holding device for eyeglasses that overcomes the problems experienced by other holding devices. In a preferred embodiment of the present invention, the holding device for eyeglasses includes a rear flange, a flexible retaining flange spaced apart from the rear flange, and a nasaloid support member between lower portions of the rear flange and the retaining flange. The nasaloid support member has a forward portion adjacent to the retaining flange, a rear portion adjacent to the rear flange, and an intermediate portion therebetween. The nasaloid support member also has side surfaces that are adapted to support the nasal pads of the glasses when the glasses are held by the holding device, such that the bridge of the glasses is located above the intermediate portion of the nasaloid support member.

Upper portions of the rear and retaining flanges extend upwardly above the nasaloid support member and define a glasses receiving area therebetween. The upper portion of the retaining flange is a flexible portion that extends upwardly and slopes rearwardly toward the rear flange, so the upper portion is positioned above the intermediate portion of the nasaloid support member.

An arm support member is attached to the retaining flange such that the retaining flange is between the arm support member and the rear flange. The arm support member includes a support portion connected to the retaining flange. The support portion supports at least one of the arms of the glasses when the glasses are in a folded condition and being held by the holding device. An arm blocking tab of the arm support member extends upwardly from the support portion and is spaced apart from the retaining flange to define an arm receiving area therebetween. The arm blocking tab blocks the arms of the glasses from unfolding and retains the arms of the eyeglasses in the arm receiving space.

In the preferred embodiment of the invention, the rear flange has a rearwardly flaring rear lip, and the retaining flange has a forwardly flaring forward lip that is spaced apart from the rear lip to define a widened receiving area for receiving the bridge and nasal pads of the glasses between the rear and retaining flanges. A biasing member is connected to the rear flange and to the nasaloid support member. The biasing member is a resilient member adapted to engage the bridge of the glasses to minimize vibration or rattling of the glasses when the glasses are in the holding device. The biasing member also biases the bridge toward the retaining flange to a position above the intermediate portion of the nasaloid support member.

DETAILED DESCRIPTION OF THE INVENTION

Figure 1:
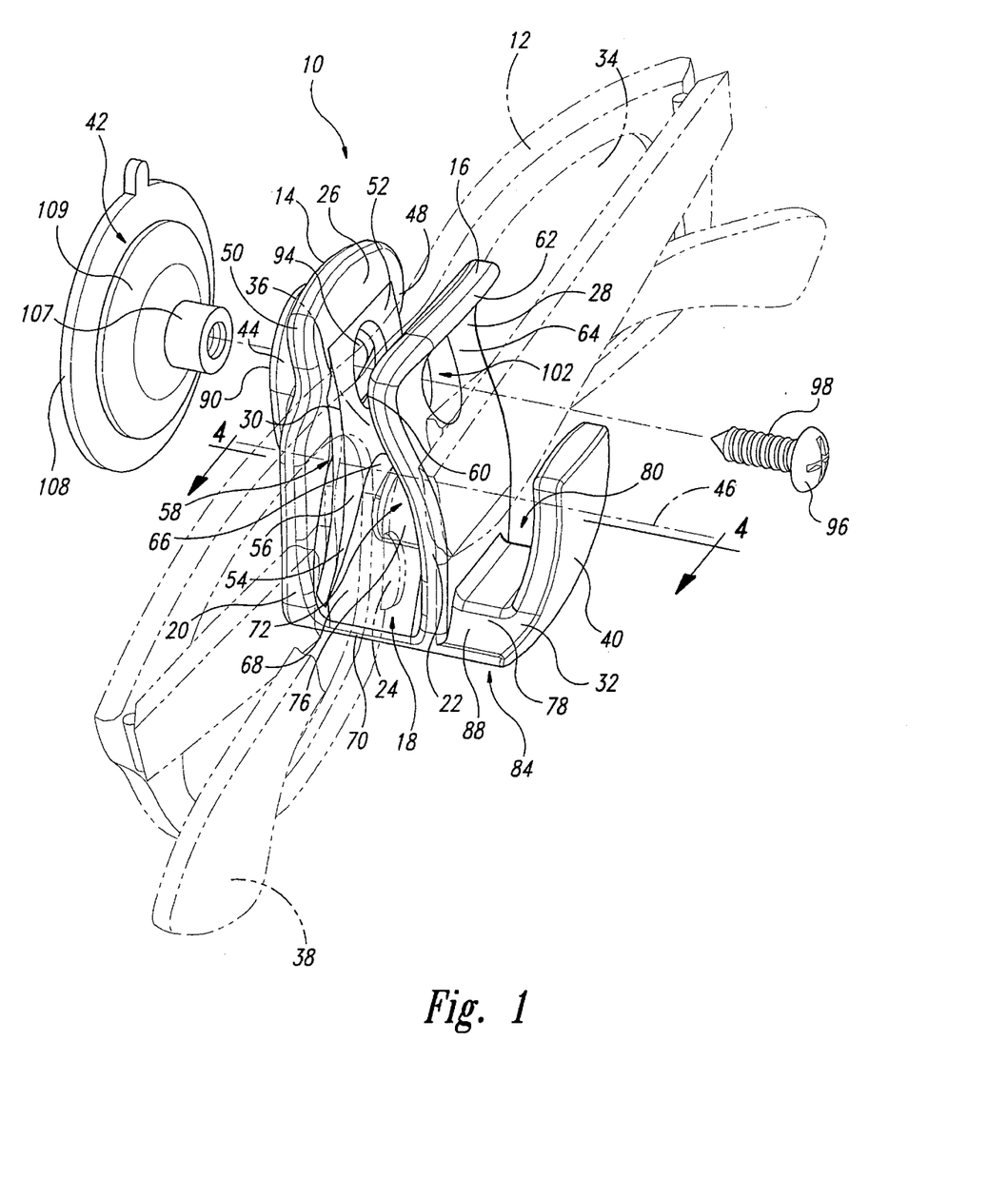
FIG. 1 is a partially exploded and cut away top isometric view of the holding device of the present invention retaining a pair of eyeglasses, illustrated in phantom lines, in a retained position.

A holding device 10 in accordance with the present invention is shown in the attached drawings for illustrative purposes. As best seen in FIG. 1, the holding device 10 is adapted to removably hold and retain a pair of eyeglasses 12, illustrated in phantom lines, in a convenient and accessible location. The holding device 10 includes a rear flange 14 and a flexible contoured retaining flange 16 spaced apart from each other. A nasaloid support member 18 extends between a lower portion 20 of the rear flange 14 and a lower portion 22 of the retaining flange 16. The nasaloid support member 18 removably supports nasal pads 24 of the glasses 12, which straddle the nasaloid support member when the glasses are in a retained position. A contoured upper portion 26 of the rear flange 14 and a flexible contoured upper portion 28 of the retaining flange 16 extend upwardly above the nasaloid support member 18 and toward each other, such that the rear and retaining flanges grip the glasses when in the retained position and removably hold the glasses in the holding device. A biasing wall 30 is provided between the rear flange 14 and the retaining flange 16 to engage and bias the glasses 12 forwardly toward the retaining flange.

A flexible L-shaped arm support member 32 is attached to the lower portion 22 of the retaining flange 16 opposite the nasaloid support member 18 such that the retaining flange is intermediate the rear flange 14 and the arm support member. The rear flange 14, the retaining flange 16, the nasaloid support member 18, and the arm support member 32 are interconnected and shaped to releasably receive and securely retain the glasses 12 in the retained position.

The holding device 10 of the preferred embodiment is constructed to removably retain, in a folded condition, conventional glasses 12 that include a pair of lenses 34, a bridge 36 extending between the lenses, the nasal pads 24 positioned between the two lenses, and foldable arms 38. The holding device 10 receives the bridge 36 between the rear flange 14 and the retaining flange 16, and the nasaloid support member 18 supports the nasal pads 24 such that the glasses face the rear flange with the lenses 34 on opposite sides of the nasaloid support member. The arms 38 extend from the outer sides of the lenses 34 and criss-cross between the retaining flange 16 and an arm blocking tab 40 of the arm support member 32. At least one of the arms 38 is supported by the arm support member so as to prevent the arms from dropping, relative to the holding device 10, and allowing the glasses 12 to rotate within the holding device.

The holding device 10 of the preferred embodiment has a suction cup 42 that provides a mounting device which is connected to a mounting portion 44 on the rear flange 14. When the suction cup 42 is secured to the holding device, the suction cup and holding device are removably mountable on a flat, smooth, support surface, such as the windshield of an automobile. Accordingly, the holding device 10 is mountable in a convenient and accessible location with respect to, as an example, a driver or passenger of an automobile, enabling the driver or passenger to quickly and easily remove the glasses 12 from the holding device by lifting them out of the holding device when needed. The driver or passenger can also quickly and easily place the glasses 12 in the holding device 10 for safe storage.

Figure 2:
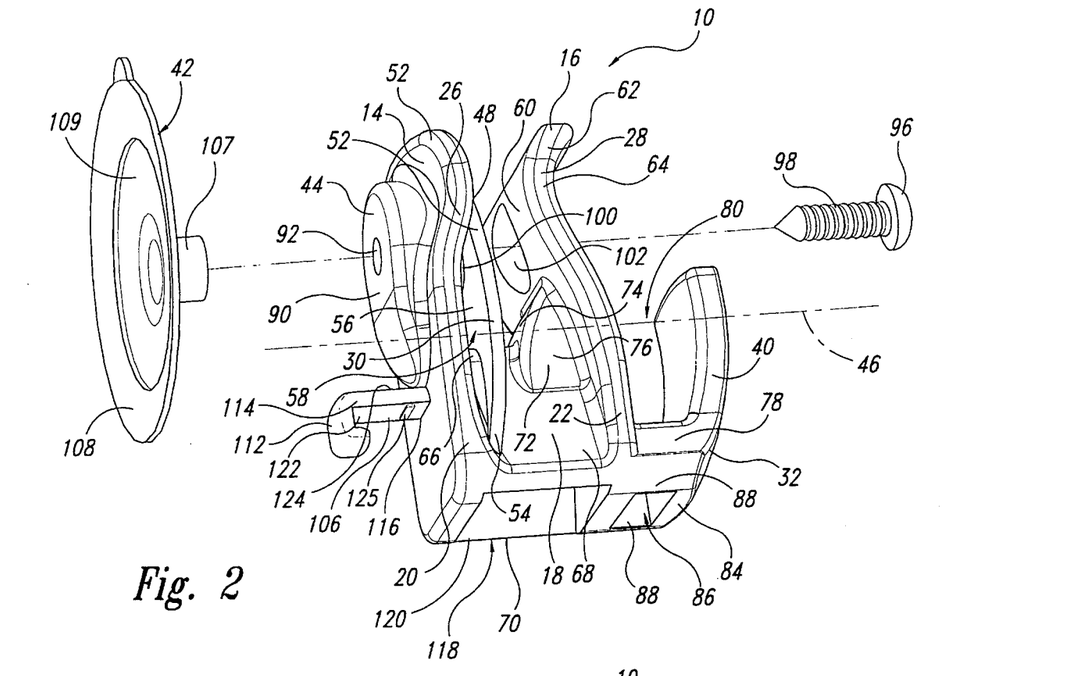
FIG. 2 is a partially exploded bottom isometric view of the holding device of FIG. 1, with the glasses not illustrated.
Figure 3:
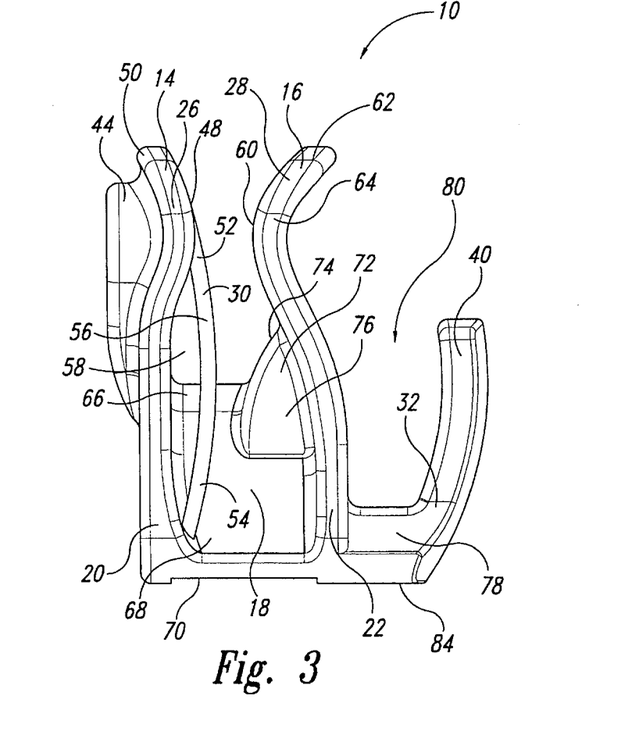
FIG. 3 is a side elevational view of one embodiment of the holding device of FIG. 2 with a suction cup and a support pin removed.

As best seen in FIGS. 1–3, the rear flange 14 of the holding device 10 includes the lower portion 20 and upper portion 26. The lower portion 20 is a generally planar member that is oriented transverse to an axis 46 which extends through the rear flange 14, the biasing wall 30, and the retaining flange 16. The upper portion 26 of the rear flange 14 extends upwardly from the lower portion 20 and away from the nasaloid support member 18. The upper portion 26 is contoured such that it is curved forwardly from the lower portion 20 toward the retaining flange 16, and at a forwardmost portion 48 flares rearwardly away from the retaining flange, thereby defining a rearwardly flaring rear lip 50. Accordingly, the forwardmost portion 48 of the rear flange's upper portion 26 is positioned above a midportion of the nasaloid support member 18.

The flexible biasing wall 30 between the rear flange 14 and the retaining flange 16 is adapted to engage the bridge 36 of glasses 12 and bias the glasses forwardly toward the retaining flange with the bridge being above the midportion of the nasaloid support member 18. The biasing wall 30 is integrally attached at its top portion 52 to the forwardmost portion 48 of the rear flange's upper portion 26, and the biasing wall is integrally attached at its bottom portion 54 to the nasaloid support member 18 forward of the rear flange's lower portion 20. The biasing wall 30 bows forwardly between its top and bottom portions 52 and 54 such that a middle portion 56 of the biasing wall is spaced forwardly apart from the rear flange 14 to define a deflection space 58 therebetween. The middle portion 56 of the biasing wall 30 is adapted to resiliently deflect into the deflection space 58 toward the rear flange 14 from a forward, undeflected position, illustrated in FIG. 1 in solid lines, to a deflected position, illustrated in phantom lines, when the glasses 12 are placed into the holding device 10 and when the bridge 36 of the glasses press rearwardly against the biasing wall. The biasing wall 30 is biased toward the undeflected position so as to engage the bridge 36 of the glasses 12 and press the glasses toward the retaining flange 16 to properly position the glasses between the rear and retaining flanges 14 and 16. In the preferred embodiment, the biasing wall 30 presses against the glasses 12 and prevents or minimizes vibration and rattling of the glasses while in the holding device 10.

As best seen in FIGS. 1–3, retaining flange 16 is integrally connected at its lower portion 22 to a forward end of the nasaloid support member 18. The upper portion 28 of the retaining flange 16 extends upwardly from the lower portion 22 and rearwardly toward the upper portion 26 of the rear flange 14. At a rearwardmost portion 60 of the retaining flange's upper portion, the upper portion flares forwardly away from the rear flange 14 to define a forwardly flaring forward lip 62. The forward lip 62 is spaced apart from the rear lip 50, and the rearwardmost portion 60 of the retaining flange 16 is directly across from the forwardmost portion 48 of the rear flange 14. Accordingly, the rear lip 50 and forward lip 62 define a wide receiving area 64 therebetween to provide a large opening that facilitates in easy and quick placement of the glasses 12 into the holding device 10.

The rear flange 14 and the retaining flange 16 are closest to each other at the forwardmost and rearwardmost portions 48 and 62, respectively, above the nasaloid support member 18. The upper portion 28 of the retaining flange 16 slopes rearwardly from the lower portion 22, such that the rearwardmost portion 62 is above the midportion of the nasaloid support member 18. When the glasses 12 are in the retained position, the upper portion 28 of the retaining flange 16 is positioned approximately over the bridge 36 of the glasses. Accordingly, the upper portion 28 of the retaining flange 16 is positioned to block the bridge 36 and thus block the glasses 12 from inadvertently moving upwardly and out of the holding device 10.

In the preferred embodiment, the upper portion 28 of the retaining flange 16 is sufficiently flexible to resiliently deflect and bend toward or away from the rear flange 14 when the glasses 12 are being removed from the holding device 10 or being placed into the holding device, thereby allowing for easy and quick insertion and removal of the glasses. The retaining flange 16 is resilient and it returns toward its original, undeflected position when the glasses 12 are in the retained position or when the glasses have been removed from the holding device 10. In the retained position, most glasses 12 prevent the retaining flange 16 from returning to the original undeflected position because of the shape and size of the glasses when in the folded condition. Accordingly, the retaining flange 16 presses against the glasses 12 and provides frictional retaining forces on the glasses to minimize movement of the glasses relative to the holding device 10.

The nasaloid support member 18 of the illustrated embodiment has a curved top portion 66 that defines a rounded-apex extending under the biasing wall 30 between the rear flange 14 and the retaining flange 16. The nasaloid support member 18 has a pair of sidewalls 68 that slope downwardly from the top portion 66 and outwardly away from each other. The sloped sidewalls 68 terminate at bottom edges 70 of the nasaloid support member 18. The sidewalls 68 provide a support surface on which the nasal pads 24 of the glasses 12 engage and rest when the glasses are in the retained position. The inverted V-shaped nasaloid support member 18 provides a saddle configuration that removably receives the nasal pads 24 on opposite sloping sidewalls 68. The nasaloid support member 18 of the preferred embodiment has a shape generally corresponding to the shape of a person's nose in the area that supports the glasses when the person wears the glasses.

The nasaloid support member 18 of the preferred embodiment is constructed of a flexible, elastomeric material that provides frictional resistance to movement of the nasal pads 24 and the glasses 12 relative to the holding device 10. Accordingly, the nasaloid support member 18 facilitates in retaining the glasses 12 in a desired orientation on the holding device 10 with the bridge 36 being supported above the nasaloid support member 18 to minimize tipping or slipping of the glasses when in the retained position.

As best seen in FIGS. 2 and 3, a sloped blocking member 72 is connected to the forward portion of the nasaloid support member 18 and to the retaining flange 16 to provide a blocking structure that blocks the nasal pads 24 or the bridge 36 of the glasses 12 from lateral and rotational movement relative to the holding device 10. In the illustrated embodiment, the blocking member 27 is integrally attached to the top portion 66 and sloped sidewalls 68 of the nasaloid support member 18, and to the rear surface of the retaining flange 16. The blocking member 72 has a sloped rear surface 74 that extends upwardly from the nasaloid support member 18 and forwardly toward the retaining flange 16. Blocking walls 76 of the blocking member 72 extend from the outer edges of the sloped rear surface 74 to the retaining flange 16, such that the blocking walls are generally perpendicular to the retaining flange.

If the distance between the nasal pads 24 of the glasses 12 is sufficiently broad and allows the glasses to sit low on the nasaloid support member 18, the blocking walls 76 are immediately adjacent to the sides of the bridge 36, and the blocking walls provide a blocking surface that block the bridge of the glasses from excess lateral or tipping movement when the glasses are in the retained position.

If the glasses 12 have a narrow distance between the nasal pads 24, the nasal pads rest on the sidewalls 68 of the nasaloid support member 18 and on the blocking walls 76. The bridge 36 is supported above the sloped rear surface 74. Accordingly, the nasal pads 28 directly engage the blocking walls 76 to prevent slipping, tipping, or misalignment of the glasses 12 when in the retained position, when, for example, the holding device 10 and eyeglasses are subject to jostling or bumping, as is typically experienced during the operation of an automobile or boat.

In the preferred embodiment, the holding device 10 is an injection molded, unitary member. The injection molded holding device 10 is configured such that the retaining flange 16 is a resilient member having a selected flexibility that is more flexible than the rear flange 14, but less flexible than the arm blocking tab 40 of the arm support member 32. The flexibility of the rear flange 14, the retaining flange 16, or the arm blocking tab 40 can be modified by increasing or decreasing the thickness of the respective component.

The preferred material for the holding device 10 is a elastomeric material having a durometer value of 50–80 so as to provide a flexible structure that can be easily deflected as needed while maintaining structural rigidity, thereby facilitating easy and quick installation or removal of the glasses 12. The elastomeric material is resilient and has shape memory which allows it to return to its original shape when the glasses 12 are removed from the holding device 10. The preferred material is a soft rubber having a durometer of 50–65. This rubber material provides surfaces that do not scratch the glasses 12, yet provide frictional resistance when in contact with the glasses at the biasing wall 30, the nasaloid support member 18, or the retaining flange 16. The frictional resistance effectively resists movement of the glasses 12 relative to the holding device 10 when the glasses are in the retained position. In an alternate embodiment, the holding device 10 is injection molded with a resilient material having a lower durometer, resulting in an even more flexible holding device.

As best seen in FIGS. 1–4, the arm support member 30 is a flexible L-shaped member having a support portion 78 that forms a horizontal leg, and the arm blocking tab 40 forms a generally vertical leg. The support portion 78 is integrally attached at a rear end to the front side of the retaining flange 16, and integrally attached at a front end to the arm blocking tab 40. The arm blocking tab 40 extends upwardly from the support portion 78 and is spaced forwardly apart from the retaining flange 16 such that the retaining flange is between the arm blocking tab and the rear flange 14. The arm blocking tab 40 and the retaining flange 16 are spaced apart to define an arm receiving space 80 therebetween that removably receives the arms 38 of the glasses 12. Accordingly, the arm blocking tab 40 blocks the arms 38 from unfolding when the glasses are in the holding device 10.

The arm blocking tab 40 is connected at its lower portion to the support portion 78, such that the top of the arm blocking tab is movable relative to the retaining flange 16. The flexible rubber material of the preferred embodiment enables the arm blocking tab 40 to generally pivot about its lower portion for movement of the top of the arm blocking tab toward and away from the retaining flange 16. Such flexibility of the arm blocking tab 40 allows for easy installation or removal of the glasses 12 from the holding device 10.

In one embodiment, the arm blocking tab 40 extends upwardly and forwardly from the support portion 78, then curves rearwardly toward the retaining flange 16. The arm blocking tab 40 is approximately one-half the height of the retaining flange 16. The lower height of the arm blocking tab 40 in combination with the contour of the retaining flange 16 results in a wide top opening to the arm receiving space 80. In an alternate embodiment, not illustrated, the arm blocking tab 40 is approximately the same height as the retaining flange 16 and has a contour that generally corresponds to the contour of the retaining flange. Accordingly, an upper portion of the arm blocking tab 40 is positioned above a midportion of the support portion, thereby providing a blocking structure above the arms 38 of the glasses 12 when in the retained position. In this alternate embodiment, the arm blocking tab 40 is more flexible and has less stiffness than the retaining flange 16, so as to allow the arm blocking tab to be deflected easily, thereby allowing for quick installation or removal of the glasses 12.

The support portion 78 of the arm support member 32 has a generally flat upper surface 82 that supports at least one of the arms 38 of the glasses 12 when the glasses are in the retained position. As a result, the arms 38 are supported so as to prevent the glasses 12 from rotating and hanging in the holding device.

Figure 4:
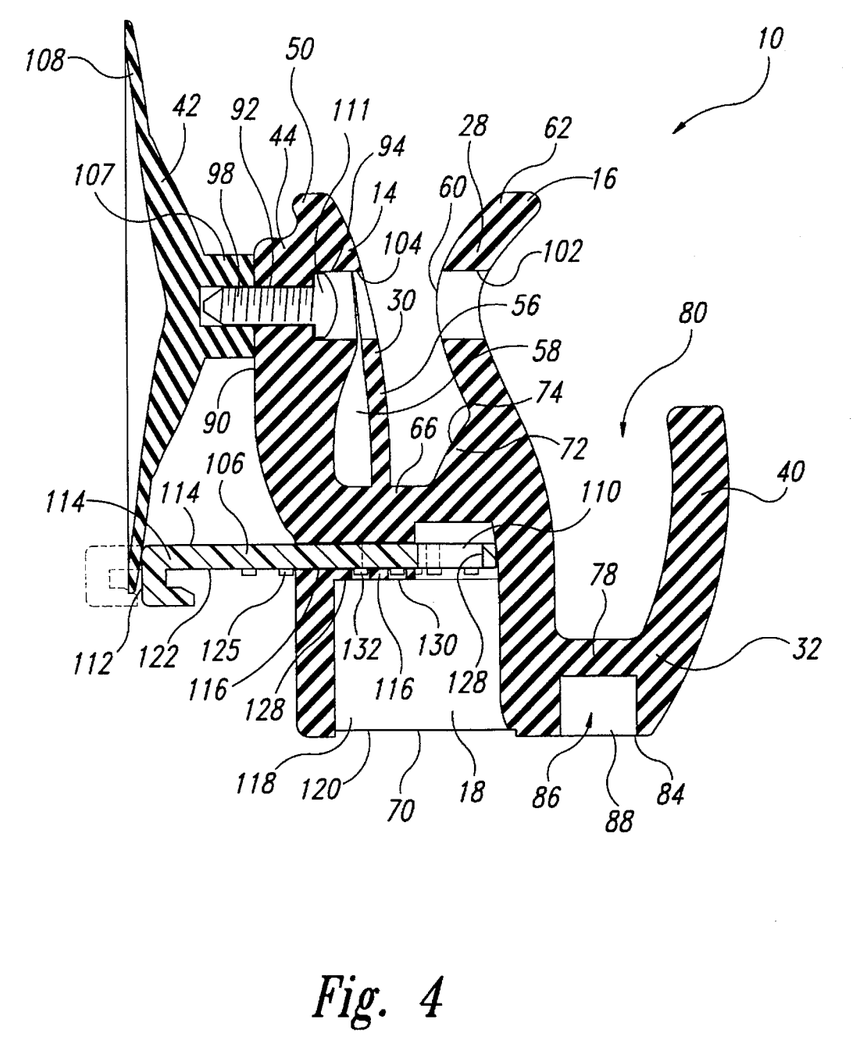
FIG. 4 is a cross-sectional view taken substantially along line 4—4 of FIG. 1, with the glasses not illustrated.
Figure 5:
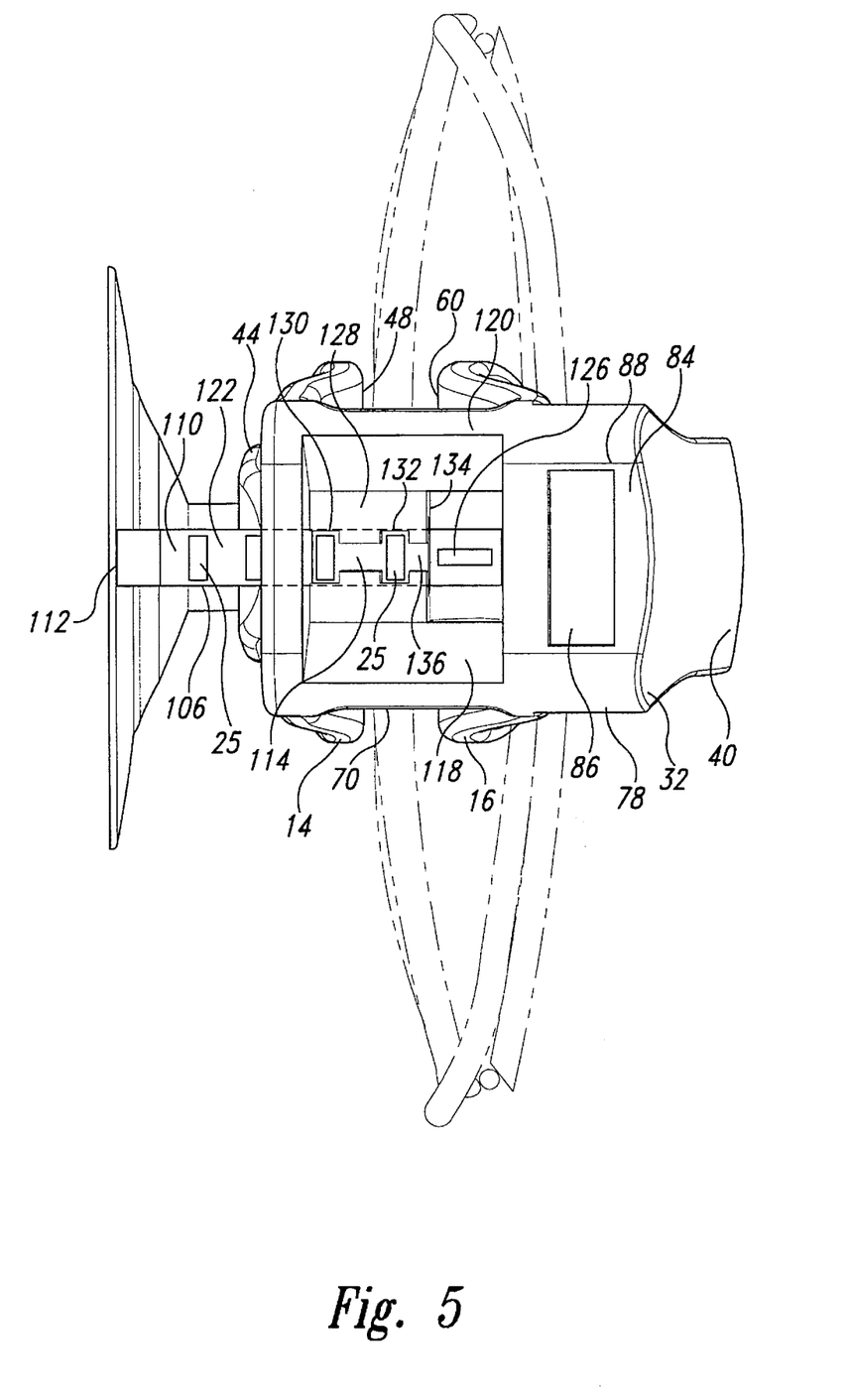
FIG. 5 is a bottom view of the holding device of FIG. 1, with the glasses illustrated in phantom lines.

As best seen in FIGS. 2, 4, and 5, an underside 84 of the support portion 78 has a rectangular cavity 86 therein. The cavity 86 and the underside 84 define relatively thin, flexible sidewalls 88 that are adapted to elastically and resiliently deflect when the arm blocking tab 40 is moved toward or away from the retaining flange 16, such that the arm blocking tab will substantially pivot about its lower end. The flexible sidewalls 88 are elastically resilient, such that when the arm blocking tab 40 is generally pivoted about its lower end, thereby deflecting the sidewalls, the sidewalls will return to the original, undeflected condition, thereby moving the arm blocking tab to its initial, undeflected position. The cavity 86 and sidewalls 88 in the underside 84 of the support portion 78 allow the arm blocking tab 40 to be easily deflected or moved relative to the retaining flange 16, thereby enhancing the flexibility of the arm blocking tab.

In an alternate embodiment, the holding device 10 includes an arm blocking tab 40 that is substantially the same height as the retaining flange 16, the support portion 78 of the arm support member 32 does not have a cavity in the underside 84, in part, because the length of the arm blocking tab provides a longer lever arm for deflection or bending of the arm blocking tab during installation or removal of the eyeglasses.

As best seen in FIGS. 2 and 4, the mounting portion 44 of the holding device 10 is integrally attached to the upper portion 26 of the rear flange 14. The mounting portion 44 is below the rear lip 50 and extends rearwardly away from the rear flange 14. The mounting portion 44 has a flat mounting surface 90 adapted to engage the suction cup 42, or to directly engage the support structure to which the holding device is secured. The mounting portion 44 has a mounting aperture 92 therein that is coaxially aligned with a fastener aperture 94 extending through the forward-most portion 48 of the rear flange's upper portion 26. In the preferred embodiment, the mounting aperture 92 has a circular cross-section that is smaller than the circular cross-section of the fastener aperture 94 to provide a recess that receives the head 96 of a fastener 98, which is either attached to the suction cup 42 or secured directly to a support structure. The recess is sized to ensure the head 96 of the fastener 98 does not protrude forwardly from the rear flange 14.

The top portion 52 of the flexible biasing wall 30 and the upper portion 28 of the retaining flange 16 each have an access aperture 100 and 102, respectively, that are coaxially aligned with the fastener aperture 94 and the mounting aperture 92. The access apertures 100 and 102 are sized to allow the fastener 98 to be passed therethrough and to allow a screwdriver or other mounting tool to extend therethrough. Accordingly, the access apertures 100 and 102 allow for easy access to the head 96 of the fastener 98 during installation of the suction cup 42, or during mounting of the holding device 10 directly to a support structure. In the alternate embodiment wherein the arm blocking tab 40 is approximately the same height as the retaining flange 16, the upper portion of the arm blocking tab has an access aperture therethrough that is coaxially aligned with the access apertures 100 and 102 to allow a screwdriver or other tool to extend therethrough and gain access to the fastener 98.

In one embodiment, the holding device 10 is removably attached to the suction cup 42 to allow the holding device to be mounted in a selected position to a smooth, flat support surface, such as a windshield, or the like. The fastener 98 extends through the fastener aperture 94 and the mounting aperture 92, and securely attaches to a hub 107 of the suction cup 42. The fastener 98 pulls the hub 107 into engagement with the rear face 90 of the mounting portion 44. A cup portion 109 of the suction cup 42 faces away from the mounting portion 44 and provides a curved suction surface that will releasably engage the flat support surface. The fastener 98, such as a screw, is used for the versatility of being secured to the suction cup 42 or being secured directly to the support structure. In an alternate embodiment, the holding device 10 is fastened directly to a mounting support, such as a dashboard or the like, of an automobile or a boat, by the fastener 98. In another alternate embodiment, the holding device 10 is secured to a support structure by other conventional mounting techniques including, as an example, hook and loop material, including Velcro™, or adhesive materials positioned between the mounting portion 44 and the support structure.

A substantially rigid, removable support pin 106 extends between the holding device 10 and an outer rim 108 of the suction cup 42 to prevent the holding device from bending rearwardly about the fastener 98 and moving past a selected position toward the suction cup. Accordingly, the support pin 106 provides rigidity to the holding device 10, particularly when placing the glasses 12 in the retained position.

As best seen in FIGS. 4 and 5, the support pin 106 has a rear portion 110 that extends away from the rear flange 14 and terminates at an abutting end 112, which abuts the outer rim 108 of the suction cup. In the illustrated embodiment, the abutting end 112 is hook-shaped. In the alternate embodiment wherein the holding device 10 is mounted to a support structure without the suction cup, the abutting end 112 of the support pin 106 is positionable to abut the support structure and to prevent unwanted pivotal motion of the holding device, particularly when the glasses 12 are placed in the holding device and to the retained position. In an alternate embodiment, the holding device 10 is mounted to the support structure without the suction cup 42, and the holding device is sufficiently supported relative to the support structure such that the support pin 112 is not used. Accordingly, the support pin 112 is removable, and the holding device is usable with or without the support pin.

A forward portion 114 of the support pin 106 extends into the holding device 10 through a pin aperture 116 in the rear flange 14 and in the nasaloid support member 18. When the support pin 106 is in a forward position, shown in FIG. 5, the forward portion 114 of the support pin is immediately adjacent to the retaining flange 16.

The pin aperture 116 communicates with a nasaloid cavity 118 in the underside 120 of the nasaloid support member 18. The nasaloid cavity 118 extends upwardly from the underside 120 and terminates under the top portion 66 of the nasaloid support member. Accordingly, when the support pin 106 is in the forward position, the forward portion 114 of the support pin is accessible to a user through the nasaloid cavity 118.

The support pin 106 has a semi-cylindrical cross-section, including a flat lower surface 122 and a curved upper surface 124. The pin aperture 116 also has a semi-cylindrical shape to prevent the support pin 106 from rotating within the pin aperture. As best seen in FIGS. 4 and 5, the support pin 106 has a plurality of pin retention tabs 125 that are uniformly spaced apart from each other and that extend downwardly from the flat lower surface 122. The forward portion 114 of the support pin 106 has an elongated aperture 126 therein adjacent to the pin retention tabs 125. When the support pin 106 is in the forward position, the aperture 126 is within the nasaloid cavity 118 adjacent to the retaining flange 16. When the support pin 106 is in an intermediate position, shown in phantom lines in FIG. 4, the forward portion 114 of the support pin and the elongated aperture 126 are within the nasaloid cavity 118 and accessible to a user. In the intermediate position, the forward portion 114 of the support pin 106 is spaced apart from the retaining flange 16 and does not abut the retaining flange.

The support pin 106 is removably retained in the nasaloid support member 18 by the pin retention tabs 125 that engage a slotted shelf 128 in the nasaloid cavity. 118. The slotted shelf 128 has a rearward slot 130 and a forward slot 132 spaced apart from each other a distance that corresponds to the distance between the pin retention tabs 125. The rearward and forward slots 130 and 132 are sized to removably receive a respective pin retention tab 125 therein when the support pin 106 is in the forward position, shown in FIG. 5 in solid lines, and when the support pin is in an intermediate position, shown in phantom lines. When the support pin 106 is in the forward position, each of the rearward and forward slots 130 and 132 has a respective pin retention tab 125 therein to prevent the support pin from inadvertently moving rearwardly in the pin aperture 116.

The slotted shelf 128 has a forward edge 134 with an opening 136 that extends rearwardly and communicates with the forward slot 132. When the support pin 106 is in the intermediate position, the elongated aperture 126 is positioned directly above the forward slot 132 and above the opening 136 of the shelf 128. This configuration allows a user to move the support pin 106 from the intermediate position to the forward position, when the abutting end 112 of the support pin is not accessible to the user. The support pin 106 is moved by inserting a tool, such as a screwdriver or the like, into the nasaloid cavity 118 and upwardly through at least a portion of the elongated aperture 126. The tool, not shown, is moved forwardly, thereby pulling the support pin 106 forwardly to the forward position.

Accordingly, the user does not have to rely on pushing on the abutting end 112 of the support pin 106 to move the support pin to the forward position. As an example, in one embodiment, the support pin 112 is adapted to partially extend into a vent or the like ant releasably hook onto the backside of a vent blade that is typically found in the ventilation system of an automobile. As a result, the user cannot reach the abutting end 112 f the support pin 106 to push and move the support pin to the forward position. Accordingly, the tool is used to move the support pin 106 to the forward position in an easy manner.

In one embodiment, the pin retention tabs 125 are on the flat lower surface 122 of the support pin 106. In an alternate embodiment, the pin retention tabs 125 extend upwardly from the curved upper surface 124. In this alternate embodiment, the pin retention tabs 125 do not extend into the rearward and forward slots 130 and 132 in the slotted shelf 128. Instead, the pin retention tabs 125 contact and slightly deform the rear flange 14 and the nasaloid support member 18 along the top of the pin aperture 116, such that the tabs provide a detent mechanism to retain the support pin within the pin aperture so as to provide rigidity to the holding device 10 when the glasses 12 are placed into the holding device.

Numerous modifications and variations of the holding device for eyeglasses disclosed herein will occur to those skilled in the art in view of this disclosure. Therefore, it is to be understood that these modifications and variations, and equivalents thereof may be practiced while remaining within the spirit and scope of the invention as defined by the following claims.

I claim:

1. A holding device for eyeglasses, the eyeglasses having arms, nasal pads, and a bridge, comprising:

a first flange having a first upper portion;

a flexible retaining flange having a second upper portion, said second upper portion having a curved shape that extends toward said first flange, said first and second upper portions being spaced apart from each other, said second upper portion being movable relative to said first upper portion; and a nasaloid support member between said first flange and said retaining flange, said nasaloid support member having first and second end portions and an intermediate portion between said first and second end portions, said nasaloid support member having side surfaces oriented to support the nasal pads when the eyeglasses are removably held in a retained position by said holding device, a portion of said second upper portion being above said intermediate portion of said nasaloid support member.

2. The holding device of claim 1, further comprising an arm support member attached to said retaining flange, said arm support including an arm blocking tab spaced apart from said retaining flange with said retaining flange being intermediate said arm blocking tab and said first flange, said arm support member being positioned to support at least one of the arms of the eyeglasses when the eyeglasses are in the retained position.

3. The holding device of claim 1, further comprising a biasing member between said first flange and said retaining flange, said biasing member being adjacent to said intermediate portion of said nasaloid support member and being positioned to engage the bridge of the eyeglasses when the eyeglasses are in the retained position and to bias the eyeglasses toward said retaining flange.

4. The holding device of claim 1, the holding device being mountable to a mounting surface, said holding device further comprising a support pin adjustably connected to said first flange, said support pin extending away from said first flange and away from said nasaloid support member, said support pin being positioned to abut the mounting surface to provide stability to said holding device.

5. The holding device of claim 4 wherein said first flange has a pin aperture therethrough and said nasaloid support member has a pin receiving aperture coaxially aligned with said pin aperture, a first portion of said support pin being removably positioned in said pin aperture and in said pin receiving aperture.

6. The holding device of claim 1 further comprising a blocking member attached to said nasaloid support member adjacent to said retaining flange, said blocking member having side portions extending away from said retaining flange, said side portions providing blocking surfaces that block the eyeglasses from lateral movement relative to said nasaloid support member when the eyeglasses are in the retained position.

7. A holding device for eyeglasses, the eyeglasses having arms, lenses, nasal pads, and a bridge between the lenses, comprising:

a rear flange;

a flexible retaining flange spaced apart from said rear flange, said retaining flange having upper and lower portions, said upper portion having a curved portion that extends toward said rear flange;

a nasaloid support member between said rear flange and said flexible retaining flange, said nasaloid support member having first and second end portions and an intermediate portion therebetween, said nasaloid support member having sloping side surfaces adapted to support the nasal pads when the eyeglasses are held by said holding device, said upper portion of said retaining flange extending away from said nasaloid support member with a portion of said upper portion of said retaining flange being above said intermediate portion of said nasaloid support member; and an arm support member attached to said retaining flange, said arm support including a support portion connected to said lower portion of said retaining flange, said support portion having an arm support surface extending away from said lower portion to support at least one of the arms of the eyeglasses when the eyeglasses are held by said holding device with the arms in a folded position, said arm support member having an arm blocking tab connected to said support portion and spaced apart from said retaining flange, said retaining flange being intermediate said arm blocking tab and said rear flange.

8. The holding device of claim 7 wherein said rear flange has a second upper portion and said first upper portion of said retaining flange is spaced apart from said second upper portion to define a bridge receiving space therebetween above said nasaloid support member, and said first upper portion has a flexible lip portion that flares away from said rear flange at said bridge receiving space.

9. The holding device of claim 8 wherein said second upper portion has a second lip portion that flares away from said retaining flange at said bridge receiving space.

10. The holding device of claim 7, further comprising a biasing member connected to said rear flange intermediate said rear flange and said retaining flange, a portion of said biasing member being spaced apart from said rear flange to engage the eyeglasses toward said retaining flange when the eyeglasses are retained by said holding device.

11. The holding device of claim 7, wherein said rear flange has a first stiffness and said retaining flange has a second stiffness, said first stiffness being greater than said second stiffness.

12. The holding device of claim 7 further comprising a blocking member attached to said nasaloid support member adjacent to said retaining flange, said blocking member having side portions extending away from said retaining flange, said side portions being positioned to provide blocking surfaces that block the eyeglasses from moving past a predetermined position relative to said nasaloid support member when the eyeglasses are held by said holding device.

13. The holding device of claim 7 wherein said support portion of said arm support is a resiliently deformable member to allow said front blocking tab to move relative to said flexible retaining member between a first position and a second deflected position.

14. The holding device of claim 7 wherein said retaining flange has a first height relative to said support portion of said arm support member, and said arm blocking tab has a second height relative to said support portion, said second height being less than said first height.

15. The holding device of claim 7 wherein said rear flange, said retaining flange, said nasaloid support member, and said arm support member are integrally connected as a unitary structure.

16. The holding device of claim 7 wherein said rear flange, said retaining flange, and said arm support member are constructed of an elastomeric material having a durometer in the range of 50–65.

17. A holding assembly for eyeglasses, the eyeglasses having arms, lenses, nasal pads between the lenses, and a bridge between the lenses, comprising:

a holding unit including
a first flange having a first upper portion;
a flexible retaining flange having a second upper portion, said second upper portion having a curved shape that extends toward said first flange, said first and second upper portions being spaced apart from each other, said second upper portion being movable relative to said first upper portion;
a nasaloid support member between said first flange and said retaining flange, said nasaloid support member having first and second end portions and an intermediate portion between said first and second end portions, said nasaloid support member having side surfaces oriented to support the nasal pads when the eyeglasses are removably held in a retained position by said holding device, a portion of said second upper portion being above said intermediate portion of said nasaloid support member;
a mounting portion connected to said first upper portion of said first flange; and a securing device connected to said mounting portion to mount said holding device to a selected remote mounting surface.

18. The holding assembly of claim 17, said holding device further including an arm support member attached to said retaining flange, said arm support including an arm blocking tab spaced apart from said retaining flange with said retaining flange being intermediate said arm blocking tab and said first flange, said arm support member being positioned to support at least one of the arms of the eyeglasses when the eyeglasses are in the retained position.

19. The holding assembly of claim 17, further comprising a biasing member between said first flange and said retaining flange, said biasing member being adjacent to said intermediate portion of said nasaloid support member and being positioned to engage the bridge of the eyeglasses when the eyeglasses are in the retained position and to bias the eyeglasses toward said retaining flange.

20. A holding device for releasably retaining eyeglasses, the eyeglasses having foldable arms, lenses, a bridge between the lenses, and nasal pads below the bridge between the lenses, comprising:

a flange member having a first lower portion and a first upper portion, said flange member having a first stiffness;

a retaining member having a second lower portion and a flexible second upper portion, said flexible second upper portion being spaced apart from said first upper portion of said flange member to define a receiving area between said flange member, said retaining member having a second stiffness that is less than said first stiffness; and a nasaloid support member between said flange member and said retaining member, said nasaloid support member having a first end portion adjacent to said first lower portion of said flange member, a second end portion adjacent to said second lower portion of said retaining member, and an intermediate portion between said first and second end portions, said flexible second upper portion being positioned above said intermediate portion and being resiliently movable relative to said nasaloid support member.

21. The holding device of claim 20, further including an arm support member attached to said retaining member, said arm support including an arm blocking tab spaced apart from said retaining member, said retaining member being between said flange member and said arm blocking tab.

22. The holding device of claim 20 wherein said flange member, said retaining member, and said nasaloid support member are elastomeric members having a durometer in the range of 50–65.

23. A holding assembly for releasably retaining eyeglasses, the eyeglasses having foldable arms, lenses, a bridge between the lenses, and nasal pads below the bridge between the lenses, comprising:

a holding device having a rear flange having a first lower portion, a first upper portion opposite said first lower portion, a rear side extending between said first lower and first upper portions, and a front side opposite said rear side, said first upper portion having a rearwardly flaring upper lip, said rear flange having a support pin aperture therethrough between said front and rear sides, said rear flange having a fastening aperture therethrough between said front and rear sides, said fastening aperture being above said support pin aperture;

a mounting portion attached to said rear side of said rear flange and extending rearwardly away from said rear side, said mounting portion having a mounting aperture coaxially aligned with said fastening aperture in said rear flange, said mounting portion extending between said support pin aperture and said rearwardly flaring upper lip, and said mounting portion having a generally flat rearward mounting surface opposite said rear side of said rear flange;

a flexible biasing flange having a top portion, a bottom portion, and a middle portion between said top and bottom portions, said top and bottom portions being integrally connected to said forward side of said rear flange, and said middle portion being spaced away from said forward side of said rear flange to define a deflection space therebetween when said biasing flange is in a forward unbiased position, said biasing flange being flexible and adapted to deflect into said deflection space toward said rear flange from said forward unbiased position to a deflected position, said biasing flange being biased toward said forward unbiased position, said biasing flange being adapted to engage the bridge of the eyeglasses when the eyeglasses are in the holding device such that the bridge of the eyeglasses deflects said biasing flange to said deflected position, and said biasing flange biases the eyeglasses away from said rear flange;

a resilient flexible intermediate flange having second upper and lower portions, a second rear side extending between said upper and lower portions, and a second front side opposite said second rear side, said second upper portion having an access aperture therethrough between said second front and second rear sides, said access aperture being substantially coaxially aligned with said fastener aperture in said rear flange to provide access to said fastener aperture through said intermediate flange, said second upper portion having a forwardly flaring second upper lip portion, said forwardly flaring second upper lip portion being spaced apart from said rearwardly flaring first upper lip portion of said rear flange to define a flared receiving portion therebetween to receive the bridge of the eyeglasses when the glasses are retained in said holding device;

a nasaloid support member between said rear flange and said intermediate flange, said nasaloid support member having a forward portion integrally attached to said second lower portion of said intermediate flange, and said nasaloid support member having a rearward portion integrally attached to said first lower portion of said rear flange, said biasing flange being connected to said nasaloid support member between said forward and rearward portions and extending away from said nasaloid support member, said nasaloid support member having sloping side surfaces between said forward and rearward portions and a rounded upper surface between said sloping side surfaces, said sloping side surfaces being adapted to engage and support the nasal pads of the eyeglasses when the eyeglasses are retained by said holding device such that the bridge of the eyeglasses is adjacent to said rounded upper surface and the lenses are on opposite sides of said nasaloid support portion, said nasaloid support member having a bottom portion between said rear and intermediate flanges and between said sloping side surfaces, said nasaloid support member having a first cavity therein with a cavity opening in said bottom portion, said first cavity extending from said cavity opening toward said rounded upper surface of said nasaloid surface, said first cavity communicating with said support pin aperture in said rear flange;

a bridge blocking member integrally attached to said rounded upper surface of said nasaloid support member adjacent to said forward portion, said bridge blocking member being integrally attached to said intermediate flange between said access aperture and said nasaloid support member, said bridge blocking member having a rearward surface that extends upwardly away from said rounded upper surface and slopes forwardly toward said intermediate flange, said bridge blocking member having side wall portions extending away from said sloping side surfaces and extending between said rearward surface and said second rear side of said intermediate flange, said side wall portions being adapted to block the bridge of the eyeglasses from moving past a predetermined position relative to said nasaloid support member and to substantially prevent the eyeglasses from excessively tilting relative to said nasaloid support member;

a forward flange spaced apart from said intermediate flange with said intermediate flange being intermediate said forward flange and said rear flange, said forward flange and said intermediate flange defining an arm receiving space therebetween to receive the arms of the eyeglasses when the eyeglasses are retained on said holding device, said forward flange being a flexible member adapted to move relative to said intermediate flange toward and away from the intermediate flange, said forward flange having a lower end portion spaced apart from said second lower portion of said intermediate flange, and said forward flange having an upper end portion opposite said lower end portion;

an arm support between said forward flange and said intermediate flange, said arm support having a rearward portion integrally connected to said second lower portion of said intermediate flange and having a forward portion integrally connected to said lower end portion of said forward flange, said arm support having a generally flat upper surface extending between said forward flange and said intermediate flange, said flat upper surface being adapted to support at least one of the foldable arms of the eyeglasses adjacent to said second lower portion of said intermediate flange when the eyeglasses are retained in said holding device, said arm support having an lower surface opposite said flat upper surface, and said arm support having a second cavity therein between said forward and rearward portions, said second cavity extending from a second opening in said lower surface toward said flat upper surface, said arm support being a resilient flexible member that resiliently deflects when said upper end portion of said forward flange is moved away from said intermediate flange such that said forward flange generally flexes about said lower end portion at said forward portion of said arm support and such that said first cavity allows said forward flange portion to move toward said rear portion of said arm support when said upper end of said forward flange is moved away from said intermediate flange, said arm support member providing a biasing force to bias said forward arm toward a first position relative to said intermediate flange portion;

a suction cup removably attached to said rearward mounting surface of said mounting portion, said suction cup having a cup portion and an attachment body connected to said cup portion;

a fastener securely retaining said attachment body of said suction cup against said rearward mounting surface with said attachment body being between said cup portion and said mounting surface, said fastener having a head portion and a threaded shaft portion, said threaded shaft portion extending through said mounting aperture in said mounting portion and removably engaging said attachment body such that said mounting portion is between said head of said fastener and said attachment body of said suction cup; and a support pin adjustably connected to said rear flange and positioned in said support pin aperture, said support pin having a shank with first and second end portions and a hook member attached to said first end, said second end portion having an elongated slot therein, said support pin having a plurality of retaining tabs thereon between said first and second end portions, said support pin being positionable within said support pin aperture with said second end portion being within said first cavity in said nasaloid support member and adjacent to said intermediate flange, said support pin extending away from said rear flange toward said suction cup with said hook member being immediately adjacent to said suction cup, said hook end being adapted to abut said suction cup to block said rear flange from moving toward said suction cup past a selected position when the eyeglasses are retained in said holding device, one of said plurality of said retaining tabs being positioned to engage said nasaloid support member to releasably retain said support pin in said selected position, said support pin being positionable with said slot in said second end portion being located within said first cavity such that a positioning tool can engage said support pin through said slot to facilitate in positioning of said support pin in said selected position.

\* \* \* \* \*